(12) United States Patent
Su et al.

(10) Patent No.: US 9,329,707 B2
(45) Date of Patent: May 3, 2016

(54) INPUT DEVICE

(71) Applicant: Primax Electronics Ltd., Neihu, Taipei (TW)

(72) Inventors: Chun-Nan Su, Taipei (TW);
Tzu-Chiang Shih, Taipei (TW);
Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/297,381

(22) Filed: Jun. 5, 2014

(65) Prior Publication Data

US 2015/0169132 A1 Jun. 18, 2015

(30) Foreign Application Priority Data

Dec. 16, 2013 (CN) .......................... 2013 1 0690364

(51) Int. Cl.
*G06F 3/042* (2006.01)
*G06F 3/0354* (2013.01)

(52) U.S. Cl.
CPC .................................. *G06F 3/03547* (2013.01)

(58) Field of Classification Search
CPC .............. G06F 3/03543; G06F 3/0421; G06F 3/03547; G06F 3/0213; G06F 3/0317; G06F 3/0414; G06F 3/045; G06F 3/0485; G06F 3/0487; G06F 3/0304; G06F 3/042; G06F 2203/0338; G06F 3/033; G06F 2203/0335

USPC .................................................. 345/156–172
See application file for complete search history.

(56) References Cited

U.S. PATENT DOCUMENTS

| 6,337,679 B1* | 1/2002 | Chou ............................ 345/156 |
| 2007/0139377 A1* | 6/2007 | Chiang et al. ................. 345/163 |
| 2009/0179854 A1* | 7/2009 | Weber et al. .................. 345/156 |
| 2010/0071967 A1* | 3/2010 | Lee et al. .................... 178/18.09 |
| 2010/0090955 A1* | 4/2010 | Chen et al. .................... 345/166 |
| 2013/0342307 A1* | 12/2013 | Auberger et al. .............. 338/47 |

\* cited by examiner

*Primary Examiner* — Ilana Spar
*Assistant Examiner* — Charles Zheng
(74) *Attorney, Agent, or Firm* — Kirton McConkie; Evan R. Witt

(57) ABSTRACT

An input device is provided. The input device includes an operation element, an optical finger navigation module, a press sensing circuit and a control unit. The optical finger navigation module senses a moving operation of the finger on the operation element so as to generate a motion signal, and the press sensing circuit is disposed under the optical finger navigation module and generates a press signal in response to a pressing operation of the finger. The control unit is electrically connected with the optical finger navigation module and the press sensing circuit, so as to generate a first control command in response to the motion signal and generate a second control command in response to the press sensing signal.

12 Claims, 5 Drawing Sheets

INPUT DEVICE

FIELD OF THE INVENTION

The present invention relates to an input device, and more particularly to an input device for controlling electronic equipment.

BACKGROUND OF THE INVENTION

With the development of science and technology, the age of multimedia and computer have come. In a computer system, an input device, such as a mouse, keyboard, or trackball, plays an important role in controlling a computer device by a user. Most of these input devices work in a photo sensing way, as disclosed in U.S. Pat. No. 6,847,350 or U.S. Pat. No. 6,300,940, or work in a force sensing way, as disclosed in U.S. Pat. No. 7,855,715, U.S. Pat. No. 5,828,363 or U.S. Pat. No. 5,659,334.

However, as the rapid development of multimedia and various kinds of software, window interfaces of computers are getting more and more complicated and diversified, and therefore, the functions provided by the conventional input devices become failing to catch up with the demand of users. In order to enhance the functions that the input device can provide, a plurality of function keys are additionally built in the input device, or a function switch button is built in the input device for switching among multiple functions with a single function key. However, it is not convenient for a user to operate the aforesaid input device in practice. In view of this, the above issues of the conventional input device should be addressed.

SUMMARY OF THE INVENTION

The present invention provides an input device, which use a photo sensing element and a press sensing element to increase operational functions of an input device and to make its operations more human-based.

In an embodiment, an input device provided according to the present invention comprises:

an operation element defined with an optical sensing region, where a moving operation and/or a pressing operation of a finger can be sensed;

an optical finger navigation module disposed under the optical sensing region for sensing the moving operation of the finger on the optical sensing region so as to generate a motion signal;

a press sensing circuit;

at least one press sensing element disposed under the optical finger navigation module and electrically connected to the press sensing circuit to generate a press signal in response to the pressing operation of the finger on the operation element; and a control unit connected with the optical finger navigation module and the press sensing circuit to generate a first control command in response to the motion signal, and generate a second control command in response to the press sensing signal.

BRIEF DESCRIPTION OF THE DRAWINGS

FIG. 6 is a schematic diagram illustrating the structure of a keyboard device that an input device according to an embodiment of the present invention is applied to.

FIG. 7 is a schematic diagram illustrating the structure of a mouse device that an input device according to an embodiment of the present invention is applied to.

DETAILED DESCRIPTION OF THE EMBODIMENTS

An input device according to the present invention may be used with an electronic equipment, and users may control the electronic equipment with a finger contacting and pressing the input device and with a palm moving on the input device. The electronic equipment may be a desk-top computer, notebook computer, tablet PC, or display (e.g. TV), but it should not be limited hereto. Alternatively, the input device according to the present invention may be an independent device coupling to the electronic equipment by an electric wire or via a wireless protocol, or may be built in the electronic equipment as a control unit.

Figure 1:
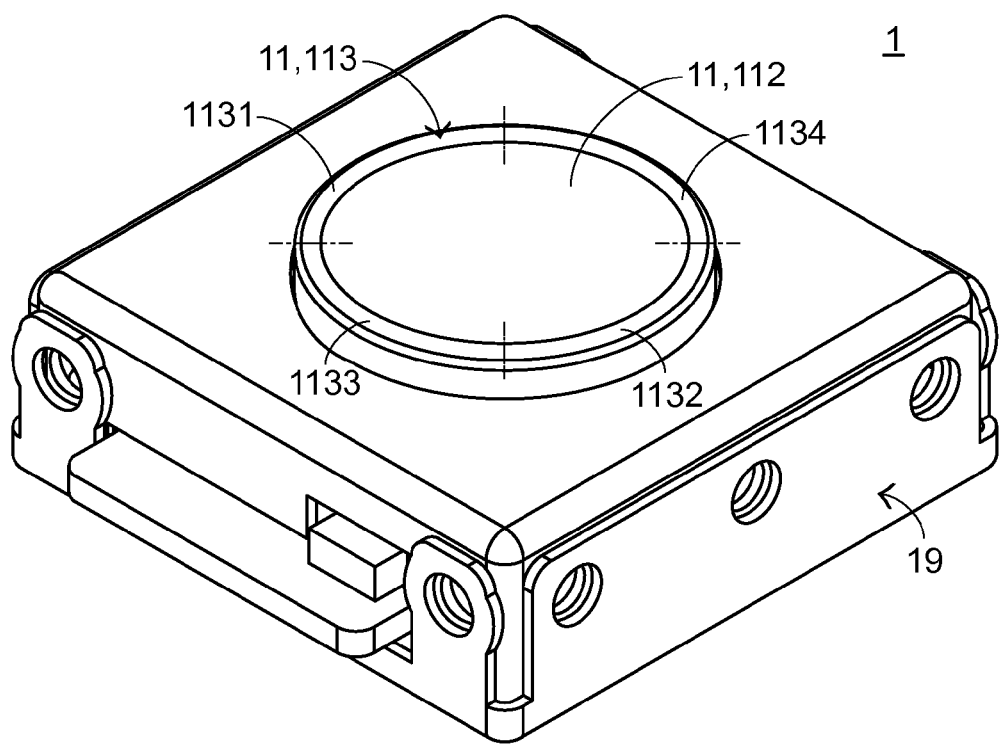
FIG. 1 is a perspective view schematically illustrating an embodiment of an input device structure according to the present invention.
Figure 2:
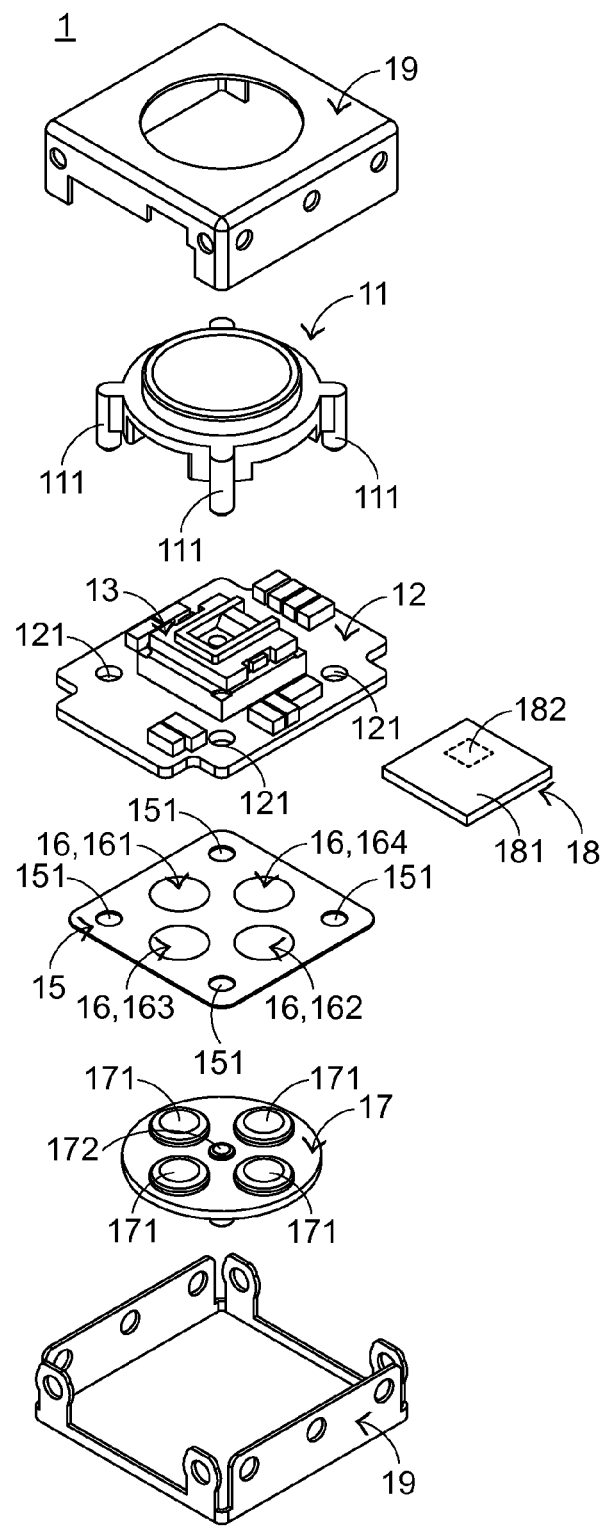
FIG. 2 is an exploded view schematically illustrating the input device shown in FIG. 1.

Please refer to FIG. 1 and FIG. 2. FIG. 1 is a perspective view schematically illustrating an embodiment of an input device according to the present invention, and FIG. 2 is an exploded view schematically illustrating the input device shown in FIG. 1. As shown, the input device 1 comprises an operation element 11, a circuit board 12, an optical finger navigation (OFN) module 13 disposed on a top surface of the circuit board 12, a press sensing circuit 14 disposed under a bottom surface of the circuit board 12 (shown in FIG. 4), a substrate 15, a plurality of press sensing elements 16 disposed on a top surface of the substrate 15, an elastic supporting element 17, a control unit 18, and a housing 19 for accommodating the aforesaid elements. The housing 19 has an opening 191 for exposing at least a portion of the operation element 11.

The substrate 15 is disposed under the circuit board 12, and the elastic supporting element 17 is used for supporting the substrate 15, circuit 12 and operation element 11. In this embodiment, the substrate 15 is made of plastic material, such as Polyethylene Terephthalate (PET), Polycarbonate (PC) or Polymethylmethacrylate (PMMA). The press sensing elements 16 are distributed at edges of the substrate 15, and the press sensing elements 16 are respectively a front sensing element 161, a rear sensing element 162, a left sensing element 163 and a right sensing element 164. Each of the press sensing elements 16 may be a Force Sensing Resistance (FSR). The elastic supporting element 17 is tablet-shaped, and has a plurality of rubber projections 171 projected upwards corresponding to a plurality of press sensing elements 16 and has a supporting projection formed at the center region of the elastic supporting element 17, and serving as a fulcrum.

Preferably, but not limited hereto, the operation element 11 has a plurality of poles 111 extending downwards, the circuit board 12 has a plurality of circuit board through holes 121 corresponding to the poles 111, and the substrate 15 has a plurality of substrate through holes 151 corresponding to the poles 111 respectively; wherein each of the poles 111 penetrates through and is fastened in the corresponding circuit board through hole 121 and the corresponding substrate through hole 151. With such an arrangement, the operation element 11, the circuit board 12 and the substrate 15 can be linked-up together.

It should be noted that the description mentioned above is just an embodiment, the material of the substrate 15, the structures, the amount and the positions of the press sensing elements 16, the structure of the elastic supporting element 17, and the linking-up mechanism among the operation 11, circuit board 12 and substrate 15 are not limited hereto. For example, each pole may be attached to the circuit board or substrate in an adhesion way. Furthermore, although the optical finger navigation module 13 and the press sensing circuit 14 are both disposed on a single circuit board 12 (above the circuit board 12 and under the circuit board 12 respectively), people skilled in the art may proceed with any other equivalent designs according to practical demands. For example, the optical finger navigation module 13 and the press sensing circuit 14 may be respectively disposed on two different circuit boards, and the two circuit boards, operation element 11 and substrate 15 may be linked-up together.

Further, the operation element 11 is defined with an optical sensing region 112 exposing outside the housing 19. In the optical sensing region 112, a moving operation and/or a pressing operation of the finger of a user can be sensed. The optical finger navigation module 13 is disposed under the optical sensing region 112. With such an arrangement, when the user's finger moves on the optical sensing region 112, the optical finger navigation module 13 can sense the moving operation (as motion tracking) of the finger on the optical sensing region 112 so as to generate a motion signal.

Figure 3:
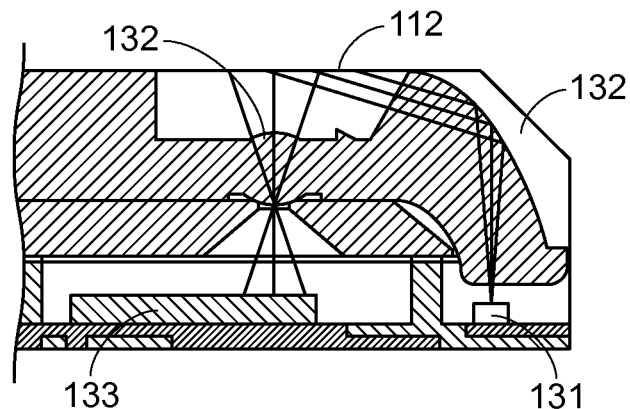
FIG. 3 is a cross-sectional view illustrating an inner structure of an optical finger navigation module according to an embodiment of the present invention.

Please refer to FIG. 3, which is a cross-sectional view illustrating an embodiment of an optical finger navigation module according to the present invention. The optical finger navigation module 13 comprises a light source 131, an optical lens set 132 and a sensor 133. The light source 131 is used for generating and emitting light beams, and the optical lens set 132 is used to make the light beams proceed toward the optical sensing region 112, and the light beams pass through the optical sensing region 112 and meet the surface of the user's finger. Moreover, the optical lens set 132 focuses the light beams reflected by the user's finger onto the sensor 133, and thereby, the sensor 133 generates the motion signal according to the received light beams. In other words, the sensor 133 senses the pattern of the surface of the finger according to the light beams reflected from the surface of the finger, and the sensor 133 generates the motion signal according to the variation of the pattern of the surface of the finger.

Figure 4:
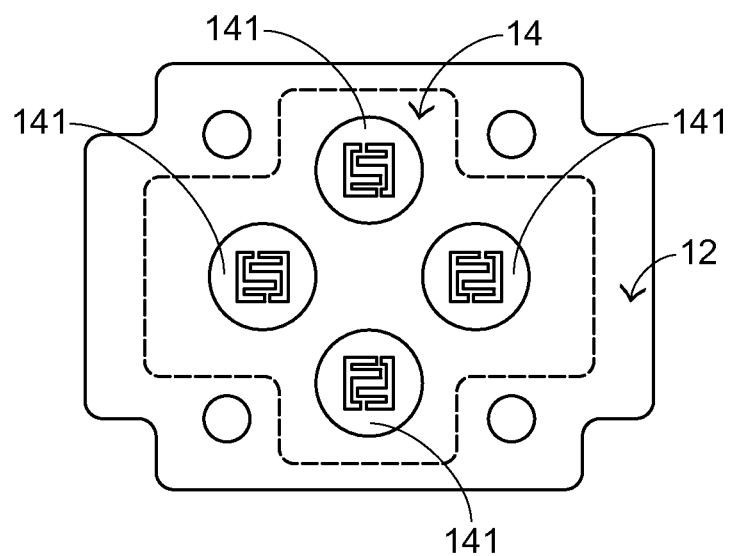
FIG. 4 is a schematic view showing a bottom surface of a circuit board shown in FIG. 1.

Please refer to FIG. 4, which is a schematic diagram illustrating a bottom surface of a circuit board shown in FIG. 1 and in which the press sensing circuit according to the present invention is also shown. The press sensing circuit 14 has a plurality of circuit connecting portions 141 corresponding to the plurality of press sensing elements 16, and each of the circuit connecting portions 141 contacts with the corresponding one of the press sensing elements 16 thereunder. When the user's finger presses a portion of the operation element 11 with a force larger than a predetermined level, the operation element 11, the circuit board 12 and the substrate 15 would be jointly moved in a corresponding direction in response to the force, so that the substrate 15 is thrust by the corresponding rubber projections 171 thereunder. With such an arrangement, the impedance of the corresponding press sensing element 16 varies with a level of the pressing operation of the finger on the operation element, and thereby, the press sensing circuit 14 generates a press signal accordingly. In addition, when the user's finger presses the operation element 11, the elastic supporting element 17 would generate an elastic force feedback to the substrate to impart an operational feeling to the user.

Preferably, but not limited hereto, the operation element 11 is further defined with a touch region 113 exposing outside the housing 19. The touch region 113 surrounds the optical sensing region 112 and has different touch feeling from the optical sensing region 112, e.g. frictional feeling, for being pressed by the user's finger. With such an arrangement, when the user operates the input device 1, the region for finger moving and the region for finger pressing can be readily distinguished by the user, so as to facilitate the user's operation. Certainly, the press sensing region 113 is not the only region that can be pressed by the finger.

Furthermore, please refer to FIG. 2 again. As shown, the control unit 18 is electrically connected to the optical finger navigation module 13 and press sensing circuit 14. When the control unit 18 receives a moving signal from the optical finger navigation module 13, the control unit 18 generates a first control command in response to the motion signal to the electronic equipment (not shown). When the control unit 18 receives a press signal form the press sensing circuit 14, the control unit 18 generates a second control command in response to the press signal to the electronic equipment. In this embodiment, the control unit 18 comprises a control circuit board 181 and a microprocessor 182, and electrically connects to the circuit board 12 by electric wires (not shown) to be electrically connected with the optical finger navigation module 13 and the press sensing circuit 14. It should be noted herein that the above embodiment is given for just illustration purpose, and people skilled in this art may proceed with any other equivalent designs according to practical demands. For example, the control unit may be a microprocessor directly disposed on the circuit board.

Figure 5:
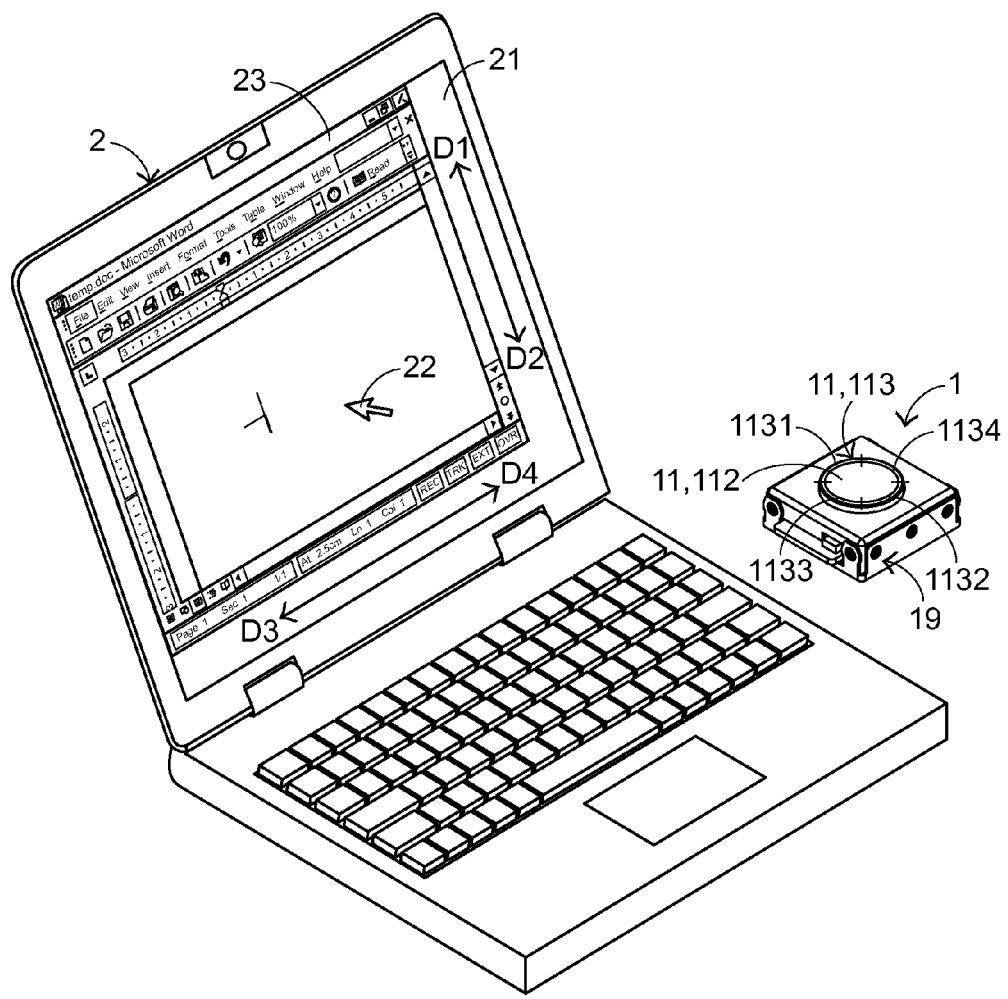
FIG. 5 is a perspective view schematically illustrating an exemplified application of an input device according to the present invention.

Please refer to FIG. 5, which is a schematic diagram illustrating the application of the input device according to an embodiment of the present invention. In this embodiment, the electronic equipment is a notebook computer 2, and the input device 1 is communicable with the notebook computer 2 with signals. The user controls a cursor 22 on the screen 21 of the notebook with his finger moving on the operation element 11 in the optical sensing region 112, and controls scrolling of a window 23 on the screen 21 of the notebook computer 2 with his finger pressing on the operation element 11 in the touch region 113.

In more detail, when the user's finger is moving in the optical sensing region 112, the control unit 18 receives a motion signal from the sensor 133 and analyzes the distance and the vectors of the movement of the user's finger. Accordingly, the first control command is generated and sent to the notebook computer 2 to move the cursor 22 on the screen 21 corresponding to the moving operation of the finger.

Furthermore, when the user's finger presses in a front region 1131 of the press sensing region 113, the press sensing circuit 14 generates and sends the second control command to the notebook computer 2 in response to the variation of the impedance of the front sensing element 161, to scroll the window upwards (e.g. in the direction D1). likewise, when the user's finger presses in a rear region 1132 of the press sensing region 113, the press sensing circuit 14 generates and sends the second control command to the notebook computer 2 in response to the variation of the impedance of the rear sensing element 162, to scroll the window downwards (e.g. in the direction D2); when the user's finger presses in a left region 1133 of the press sensing region 113, the press sensing circuit 14 generates and sends the second control command to the notebook computer 2 in response to the variation of the impedance of the left sensing element 163, to scroll the window leftwards (e.g. in the direction D3); and when the user's finger presses in a right region 1134 of the press sensing region 113, the press sensing circuit 14 generates and sends the second control command to the notebook computer 2 in response to the variation of the impedance of the right sensing element 164, to scroll the window rightwards (e.g. in the direction D4).

It should be noted herein that the above embodiment is described for illustration purpose only, but not limited hereto. In other words, the first control command and the second control command generated by the microprocessor, in response to the received signals, may be replaced by alternative control means, and people skilled in this art may proceed with any other equivalent designs according to practical demands. For example, when the user clicks on the operation element 11 in the optical sensing region 112 just like clicking on a conventional mouse's left button or right button, the control unit 18 generates the first control command to execute corresponding functions. Alternatively, the user's clicking operation on the operation element 11 in the left region 1133 of the touch region 113 may simulate the clicking operation on a conventional mouse's left button while the user's clicking operation on the operation element 11 in the right region 1134 may simulate the clicking operation on a conventional mouse's right button so that the control unit 18 generates the second control command to execute corresponding functions.

Figure 6:
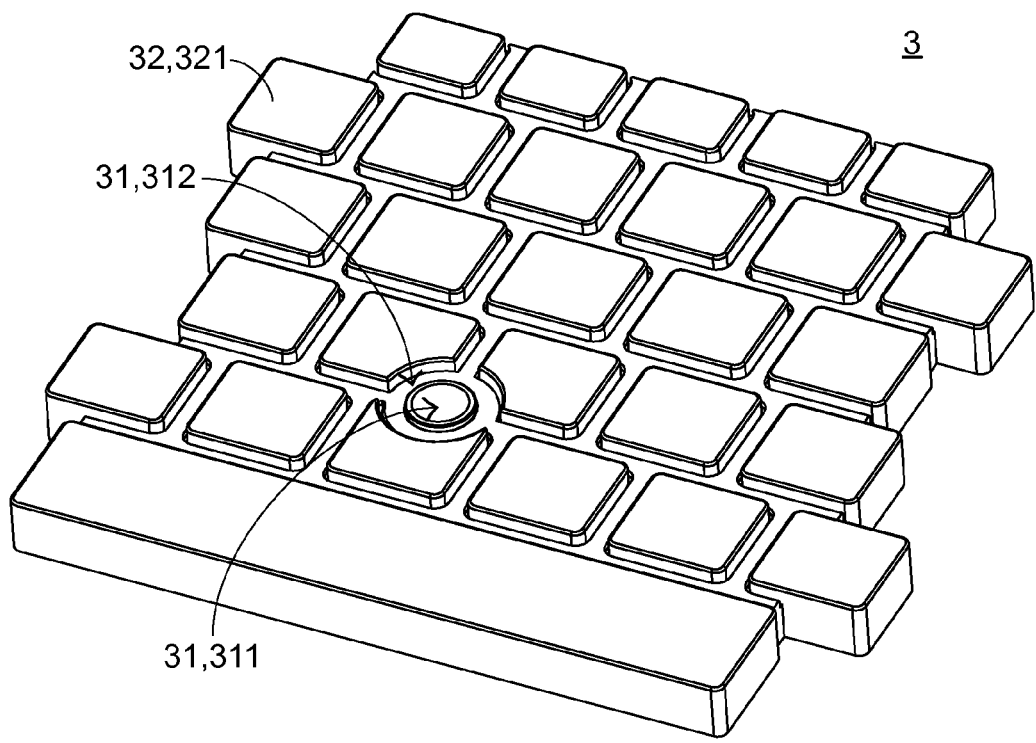

With reference to FIG. 6, a schematic diagram illustrates the structure of a keyboard device that an input device according to an embodiment of the present invention is applied to. In this embodiment, a keyboard device 3 comprises a plurality of keys 32 and an input device 31, and the key caps 321 of the keys 32 and the operation element 311 of the input device 31 are exposed outside the housing 312 of the input device 31 for being operated by the user. The configuration of the input device 31 is essentially the same as the aforementioned embodiment, and the configurations of the keys are well known to people skilled in this art, so it will not be redundantly described herein.

Figure 7:
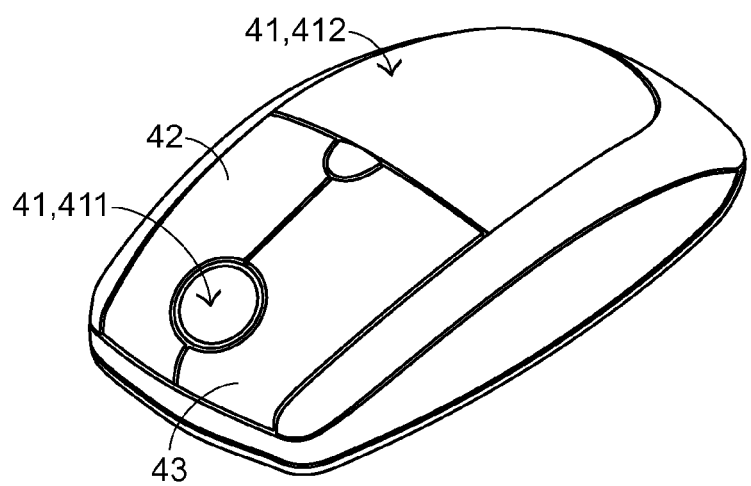

With reference to FIG. 7, a schematic diagram illustrates the structure of a mouse device that an input device according to an embodiment of the present invention is applied to. A mouse device comprises a left button 43, a right button 42 and an input device 41, and a control element 411 of the input device 41 is located between the left button 43 and the right button 42. The left button 43, the right button 42 and the operation element 411 are exposed outside a housing 412 of the input device 41 for being operated by the user. The configuration of the input device 41 is essentially the same as the aforementioned embodiment, and the configurations of the left button 43 and the right button 42 are well known to people skilled in this art, so it will not be redundantly described herein.

From the above descriptions, it is understood that since the input device according to the present invention comprises both an optical finger navigation module and a press sensing circuit, wherein the optical finger navigation module senses the operation action of the finger in an optical sensing manner, and the press sensing circuit, preferably together with the press sensing elements, senses the operation action of the finger in a press sensing manner. Therefore, the functions of the input device are enhanced and the operations of the input device are getting human-based, so as to be of high value in industry.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An input device, comprising:
   an operation element defined with an optical sensing region, where a moving operation and/or a pressing operation of a finger can be sensed;
   an optical finger navigation module disposed under the optical sensing region for sensing the moving operation of the finger on the optical sensing region so as to generate a motion signal;
   a press sensing circuit;
   at least one press sensing element disposed under the optical finger navigation module and electrically connected to the press sensing circuit to generate a press signal in response to the pressing operation of the finger on the operation element;
   a control unit connected with the optical finger navigation module and the press sensing circuit to generate a first control command in response to the motion signal, and generate a second control command in response to the press sensing signal;
   a circuit board;
   a substrate disposed under the substrate for supporting the substrate, the circuit board and the operation element, the elastic supporting element has at least one rubber projection, and the at least one rubber projection is disposed under and aligned with the at least one press sensing element;
   wherein the press sensing circuit is formed on a bottom surface of the circuit board, and the at least one press sensing element is disposed on the top surface of the substrate, and when a portion of the operation element is pressed with a force larger than a predetermined level, the operation element, the circuit board and the substrate are jointly moved in a corresponding direction in response to the force, so that the substrate is thrust by the at least one rubber projection and the impedance of the at least one press sensing element varies with a level of the pressing operation of the finger on the operation element, and thereby, the press sensing circuit generates the press signal accordingly.

2. The input device according to claim 1, further comprising a housing for accommodating the optical finger navigation module and at least one press sensing element, wherein the housing has an opening for exposing at least a portion of the operation element.

3. The input device according to claim 1, wherein the optical finger navigation module comprises:
   a sensor;
   a light source generating and emitting light beams which pass through the optical sensing region; and
   an optical lens set projecting the light beams onto the finger and focusing the light beams reflected by the finger onto the sensor, thereby generating the motion signal.

4. The input device according to claim 1, wherein the optical finger navigation module is disposed on a top surface of the circuit board.

5. The input device according to claim 4, wherein the press sensing element is a Force Sensing Resistance (FSR), and the impedance of Force Sensing Resistance varies with a level of the pressing operation of the finger on the operation element.

6. The input device according to claim 4, wherein the substrate is made of a plastic material.

7. The input device according to claim 4, wherein the at least one press sensing element includes a front sensing element, a rear sensing element, a left sensing element and a right sensing element, which are distributed at edges of the substrate.

8. The input device according to claim 4, wherein the operation element has a plurality of poles extending downwards, the circuit board has a plurality of circuit board through holes corresponding to the poles, and the substrate has a plurality of substrate through holes corresponding to the poles, respectively; wherein each of the poles penetrates through and is fastened in the corresponding circuit board through hole and the corresponding substrate through hole.

9. The input device according to claim 1, wherein the operation element is further defined with a touch region surrounding the optical sensing region, where another pressing operation of the finger can be sensed.

10. The input device according to claim 1 for use with an electronic device, wherein the input device is coupled to an electronic device or built in the electronic device for controlling movement of a cursor on a screen of the electronic device in response to the first control command.

11. The input device according to claim 1 for use with an electronic device, wherein the input device is coupled to an electronic device or disposed in the electronic device for controlling scrolling of a window on a screen of the electronic device in response to the second control command.

12. The input device according to claim 1 for use with a keyboard device or a mouse device, wherein the input device is coupled to or built in the keyboard device or the mouse device.

* * * * *